United States Patent Office 2,836,614
Patented May 27, 1958

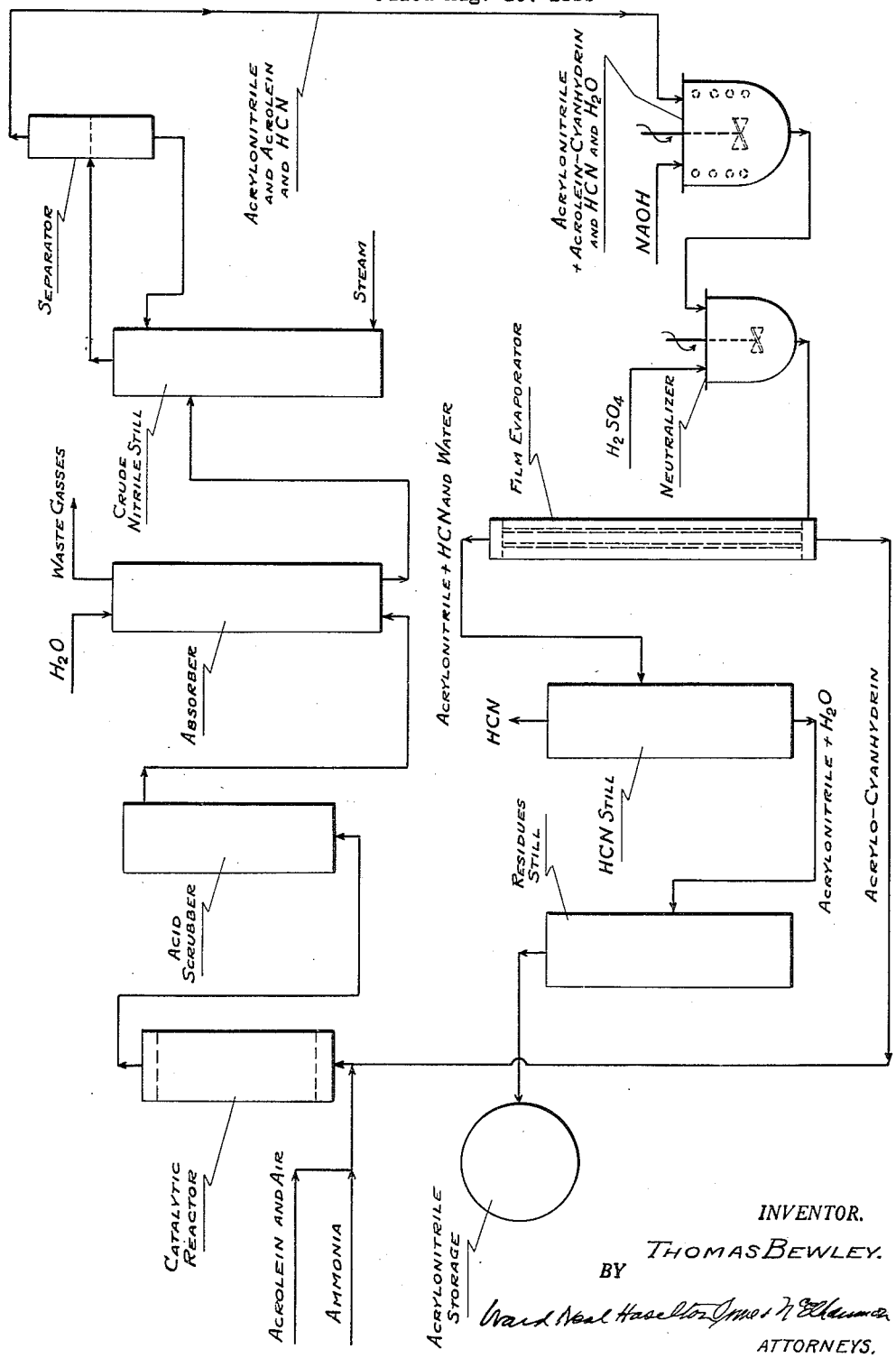

2,836,614

PROCESS FOR PRODUCING UNSATURATED NITRILES

Thomas Bewley, Epsom, England, assignor to The Distillers Company Limited, Edinburgh, Scotland, a British company Application August 13, 1953, Serial No. 374,127

Claims priority, application Great Britain August 13, 1952

17 Claims. (Cl. 260—465.9)

The present invention relates to the manufacture of substantially pure unsaturated nitrogen-containing substances, in particular acrylonitrile and methacrylonitrile.

In copending application Serial No. 262,646, filed December 20, 1951, abandoned in favor of a continuation-in-part Serial No. 432,629, now Patent 2,691,037, issued October 5, 1954, are described processes for the production of unsaturated organic nitriles in good yields and with high efficiencies by reacting unsaturated aliphatic aldehydes, such as acrolein, methacrolein or crotonaldehyde, or unsaturated alcohols such as allyl alcohol, in the vapour phase with ammonia, oxygen and a catalyst at elevated temperatures.

In such reactions the gaseous mixture issuing from the reaction zone contains the desired unsaturated nitrile together with unreacted ammonia and unsaturated aldehyde used as starting material or obtained by conversion of other compounds during the reaction. Where starting materials such as allyl alcohol or alkoxy-aldehydes are used, these are substantially completely converted to the corresponding unsaturated aldehyde under the reaction conditions. It has been found that hydrogen cyanide may also be formed as a byproduct during the nitrile forming reaction. The gaseous mixture may be washed with dilute acid for the removal of any excess of ammonia, in the presence of which losses of unsaturated nitrile and unreacted aldehyde may occur through polymerisation, and afterwards with a suitable solvent, for instance, water, which scrubs out the unsaturated nitrile. Unreacted aldehyde and hydrogen cyanide also dissolve in the solvent. When the solution is subjected to a preliminary distillation and the nitrile taken off as a water azeotrope, the resulting distillate separates into an aqueous phase and an oil phase, which latter may be decanted and which contains the unsaturated nitrile together with varying amounts of unreacted aldehyde and hydrogen cyanide.

The presence of these byproducts with the unsaturated nitrile is undesirable. For example, the presence of unsaturated aldehyde interferes with the polymerisation of the nitrile if this is subsequently desired. However, attempts to remove the byproducts by careful fractional distillation were not successful although the boiling points of the various components differ widely. This was found to be the result of the combination of the unsaturated aldehyde with the hydrogen cyanide to form an unstable high-boiling condensation product, and its subsequent decomposition. The condensation product probably consists mainly of the corresponding cyanhydrin. The formation and decomposition of this appears to take place at all parts of the still if the unsaturated aldehyde and hydrogen cyanide are both present, and results in the complete failure of the fractionating column to produce an uncontaminated nitrile fraction. The separation by fractionation of the nitrile from unsaturated aldehyde or hydrogen cyanide, when only one of these is present, presents no difficulty.

It is an object of the present invention to prevent the subsequent formation of condensation products such as cyanhydrins by removing substantially completely either the unsaturated aldehyde or the hydrogen cyanide before fractionating the impure nitrile mixture.

The invention accordingly comprises the novel processes and steps of processes, specific embodiments of which are described hereinafter by way of example, and in accordance with which I now prefer to practice the invention.

Accordingly, the present invention, in the process for the production of substantially pure unsaturated aliphatic nitriles from an impure mixture containing the desired unsaturated nitrile together with the corresponding unsaturated aliphatic aldehyde and hydrogen cyanide as impurities, comprises reacting the unsaturated aldehyde and the hydrogen cyanide together to form a condensation product so that substantially the whole of one reactant is converted, and separating the resulting condensation product from the mixture before fractionating the mixture to recover the unsaturated nitrile.

The process of the present invention may be applied to impure mixtures containing for instance, acrylonitrile, methacrylonitrile, crotononitrile, alpha-ethyl beta-propyl acrylonitrile or other similar unsaturated aliphatic nitriles together with hydrogen cyanide and the corresponding unsaturated aliphatic aldehyde (i. e. acrolein, methacrolein, crotonaldehyde or alpha-ethyl beta-propyl acrolein respectively). Such mixtures may consist of the crude nitrile with the impurities present in solution in it. Alternatively, the mixture may consist of the impure nitrile dissolved in an organic solvent, such as benzene.

The formation of the cyanhydrin condensation products according to the present invention takes place very slowly in the presence of considerable amounts of water. It is therefore a preferred feature of our invention to effect the condensation in the absence of a considerable amount of a separate aqueous phase. Thus the amount of water dissolved in the impure nitrile mixture is desirably below 10% and preferably below 5%. In a preferred embodiment the process of the invention is applied to the oil phase which is obtained when the impure nitrile mixture is extracted by means of a solvent, such as water, and the solution subjected to a preliminary distillation whereby the nitrile comes over as an azeotrope with some of the water. The distillate separates into an aqueous phase and an oil phase, the latter representing the impure unsaturated nitrile which may be used as the starting material of the present invention.

The formation of the cyanhydrin condensation products according to the process of the invention may be carried out by allowing the starting material to stand at a low temperature, for instance below about 30° C. for a time sufficient to bring the reaction between the unsaturated aldehyde and the hydrogen cyanide to completion. The reaction may be catalytically speeded up, if desired, by the addition of alkali, for example sodium or potassium hydroxide, or sodium or potassium cyanide, in such small quantities that the unsaturated nitrile present is not seriously affected, for instance up to 25 mg. equivalents of alkali per 100 ml. of the reaction mixture. The rate of reaction is also considerably affected by temperature, and above about 30° the reaction tends to be less complete unless very big amounts of one reactant are present. It is advantageous, therefore, to use as low a temperature as possible, suitably below 20° C. and preferably in the range 0° to 10° C.

It is advantageous to stir the starting material while the condensation reaction is taking place.

Further to ensure the completion of the condensation of the unsaturated aldehyde and hydrogen cyanide, particularly in the case when both reactants are originally present in approximately stoichiometric quantities, one or other of the components may be added to the impure nitrile mixture to give an excess of that reactant. It may be preferred to pass in hydrogen cyanide in excess as it can easily be removed from the unsaturated nitrile at a later stage in the process for example by fractionation. On the other hand, if it is desired to avoid the excessive handling of hydrogen cyanide the unsaturated aldehyde may be added to the impure nitrile mixture to give an excess of this component. Unsaturated aldehydes, however, suffer from a tendency to polymerise when handled in the pure state, and since they are relatively expensive it will probably be necessary for economic efficiency to isolate the aldehyde at a later stage for recycling.

Indication of the completion of the reaction is given by the absence of one or other of the components from the impure nitrile mixture, which is tested for this by methods known in the art.

The formed condensation product may be separated from the impure nitrile mixture in various ways, for example by distillation under suitable conditions, or by extraction with a suitable solvent. The separation has to be carried out under conditions which ensure that no decomposition of the cyanhydrin condensation product takes place. While the unsaturated nitriles and the corresponding cyanhydrins usually differ widely in their respective boiling points, the cyanhydrins are so unstable that they begin to decompose long before their boiling points are reached. However, separation can be achieved by simple distillation at a suitable low temperature, for instance below 100° C., and preferably below 70° C. In this way crude unsaturated nitrile is taken off, leaving the cyanhydrin condensation product in the residue. It has been found that a particularly suitable means of separating the cyanhydrin from the unsaturated nitrile is by rapid flash distillation. In this method the impure nitrile mixture is subjected to elevated temperatures for very short periods only.

In order to retard the decomposition of the cyanhydrin condensation product during the separation the oil to be distilled is preferably neutralised by the addition of small amounts of acid, particularly where the formation of the cyanhydrin condensation product had been catalysed by the addition of alkali. If desired the oil may be made slightly acid, for instance about pH 5. The decomposition of the cyanhydrin is further prevented by the presence, at all parts of the still, of a diluent, which should preferably have a boiling point higher than that of the unsaturated nitrile which is being recovered. Suitable diluents include, for example, water, toluene and xylene. It is also possible to carry out the distillation so that part of the unsaturated nitrile remains with the cyanhydrin condensation product, thus itself acting as a diluent, and retarding the decomposition of the cyanhydrin. Thus the distillation may be carried out in such a way that the residue contains, in addition to the condensation product, between 10 to 30% by weight of unsaturated nitrile.

The vapours from the distillation may be either condensed or passed directly into a fractionating column, in which the remaining impurities are removed, to give the desired unsaturated nitrile in a substantially pure state.

The cyanhydrin condensation product remaining at the bottom of the still may be returned as such to the catalytic high temperature reactor where it is decomposed to hydrogen cyanide and unsaturated aldehyde, the latter being utilised for the reaction. If desired, it may be first decomposed in a special cracking unit, the product being either recycled to the catalytic reactor as such, or partially fractionated so as to obtain a hydrogen cyanide fraction and an impure aldehyde fraction, the latter only being recycled to the catalytic reactor. When some of the unsaturated nitrile has been allowed to remain with the cyanhydrin during the separation process, the resulting mixture may be further distilled to fractionate at least partially the unsaturated nitrile, even if this results in the partial decomposition of the cyanhydrin. The distillate resulting from this auxiliary distillation may be returned to the vessel in which the crude oil is treated for the formation of the cyanhydrin.

The process of the invention is further illustrated with reference to the drawing representing a flow sheet of a preferred form of the process.

A mixture of unsaturated aldehyde such as acrolein and air is passed together with ammonia over the catalyst in the catalytic reactor which is maintained at an elevated temperature with formation of acrylonitrile. The conditions are adjusted so that the hydrogen cyanide present as impurity in the product is in excess of the residual aldehyde. The gases leaving the catalytic reactor pass through the acid scrubber where they are scrubbed with dilute sulphuric acid for the removal of ammonia and then go to the absorber. In the absorber the acrylonitrile is extracted from the gases with water and the aqueous extract of acrylonitrile thus formed is passed to the crude nitrile still. The acrylonitrile or similar nitrile comes off overhead with water and is separated into an oil phase and an aqueous phase, the latter being returned to the crude nitrile still. The oil phase passes to the cyanhydrin reactor. Catalytic amounts of alkali may be added to the reactor, in which the reaction for the formation of the acrolein cyanhydrin condensation product takes place. The acrylonitrile oil with water then passes to the neutraliser where it is neutralised with small amounts of sulphuric acid, and the resulting solution is fed into the film evaporator. From the film evaporator the products pass for separation of the acrylonitrile from the cyanhydrin condensation product-containing residues. The aqueous acrylonitrile, still contaminated with hydrogen cyanide, passes to the HCN still. In this still excess hydrogen cyanide is driven off overhead and the acrylonitrile passes to the pure acrylonitrile still from which pure acrylonitrile, containing neither acrolein nor hydrogen cyanide, is obtained as distillate and stored.

The residues, containing the acrolein-cyanhydrin condensation product, return as such to the catalytic reactor.

The following examples are given further to illustrate the process of the invention. Although acrylonitrile only has been exemplified therein, it is to be understood that the process of the invention can be applied equally well in the production of methacrylonitrile and other unsaturated aliphatic nitriles. In the examples the parts by weight and parts by volume bear the same relation to each other as do kilograms to litres.

*Example 1*

Ammonium molybdate was ground, mixed with about 4% by weight of graphite as lubricant, pelleted to a size of 5 mm. and activated by heating at 330° C. in an air stream for 5 hours to remove ammonia and water.

This catalyst was packed into a cylindrical mild steel reactor to give a catalyst volume of 31.5 parts by volume. The reactor was heated by a thermostatically controlled bath of liquid salt.

A mixture of air with acrolein and ammonia was passed over the catalyst maintained at about 376° C. The concentration of acrolein in the feed gas was 0.6% vol./vol. the molar ratio of ammonia to acrolein was 1.24, and the contact time was 2.6 seconds. 77.6% by weight of the acrolein fed was converted to acrylonitrile.

The gas leaving the catalytic reactor was scrubbed, first with dilute sulphuric acid for the removal of ammonia, and subsequently with water. The aqueous extract was distilled in a stripping still provided with a decanter. The crude acrylonitrile oil separating in the decanter contained approximately 73.5% by weight of acrylonitrile, 26.3% by weight of acrolein, 0.1% by weight of hydrogen cyanide and 0.1% by weight of acrolein cyanhydrin, and was allowed to stand at 20° C. until it showed no reaction of free hydrogen cyanide when tested by reaction with acidified silver nitrate. It will be noted that the proportion of acrolein in the above mixture is greater than that required for reaction with the hydrogen cyanide present to form the acrolein cyanhydrin and accordingly all of the hydrogen cyanide has been used up.

After the reaction to produce the cyanhydrin the resulting solution consisted of 73.5% by weight of acrylonitrile, 26.1% by weight of acrolein and 0.4% by weight of acrolein cyanhydrin. This was fed into a climbing film evaporator the jacket temperature of which was kept at 58° C., whilst maintaining a pressure of 160 mm. of mercury. 7137 parts by weight of the feed were thus split into a distillate of 6516 parts containing the bulk of the acrylonitrile and acrolein, and a residue of 572 parts containing the acrolein cyanhydrin condensation product and a small amount of acrylonitrile. The distillate, after the addition of 1% of pyrogallol (to prevent polymerisation of acrylonitrile) was distilled through a continuous fractionating column at normal pressure. A fraction boiling between 58° and 62° C., and consisting of a mixture of acrylonitrile and acrolein, was collected, and the residue, boiling at 78° C. was further fractionated in a batch still from which pure acrylonitrile (containing some water but neither acrolein or hydrogen cyanide in determinable quantities) was obtained as distillate. This acrylonitrile was found to be suitable for polymerisation purposes. The residue from the climbing film evaporator which contained the acrolein-cyanhydrin condensation product together with a small amount of acrylonitrile was found to be suitable for recycling for a subsequent run to the vessel in which the condensation reaction took place preferably after a further distillation to fractionate at least partially the unsaturated nitrile.

*Example 2*

By way of comparison with Example 1 the following experiment shows the result obtained on the careful fractionation at atmospheric pressure of a crude acrylonitrile oil, obtained as described in Example 1, and which had not been previously freed from acrolein-cyanhydrin:

| Fraction Nos. | Distillate, percent of charge | Main temperature of distillate, ° C. | Percent Composition of fraction | | |
|---|---|---|---|---|---|
| | | | Hydrogen-cyanide | Acrolein | Acrylonitrile |
| 1 | 2.8 | 26 | 100 | | |
| 2 | 1.6 | 52–71 | 22.6 | 3.7 | 63.6 |
| 3 | 16.0 | 71 | 1.35 | 1.7 | 89.6 |
| 4 | 31.0 | 71–73 | 1.5 | 2.9 | 88.2 |
| 5 | 8.6 | 60–71 | 7.8 | 15.5 | 70.0 |
| 6 | 2.9 | 72–74 | 9.3 | 7.6 | 60.7 |
| 7 | 38.0 | 70–72 | 1.87 | 4.3 | 87.4 |
| 8 | 1.1 | 72–100 | 1.9 | 3.8 | 41.7 |

After Fraction 7 water was added to the still to enable complete distillation of acrylonitrile to be achieved.

It can be seen that, in spite of the fact that the boiling points of the different constituents varied widely (hydrogen cyanide=26°, acrolein=52° and acrylonitrile =78° C. at atmospheric pressure), the fractionation proceeded very irregularly, and at no time could pure acrylonitrile be obtained, this being apparently due to the decomposition and formation of cyanhydrin in the still. Even at a reduced pressure of 200 mm. of mercury a similar result was obtained.

*Example 3*

To 3332 parts by weight of a crude acrylonitrile oil, prepared as in Example 1 and containing 95% by weight of acrylonitrile, 10.4% by weight of acrolein, 3.86% by weight of free hydrogen cyanide and 8.4% by weight of acrolein cyanhydrin, was added with vigorous stirring 2 parts by weight of a 20% weight/weight aqueous sodium hydroxide solution. The resulting solution was stirred for 2 hours at 10° C., when it was found to contain 2.2% of acrolein and no free hydrogen cyanide ("Volhard" determination). The solution was made slightly acid by stirring in an amount of sulphuric acid which produced at low temperature a pH of 5.0 (as determined on extracting with an equal volume of water), and was then subjected to flask distillation in a film evaporator at a maximum temperature of 60° C. The acrylonitrile was distilled over while the acrolein-cyanhydrin condensation product remain in the residue. The distillation was carried out in such a way that the residue contained, in addition to the cyanhydrin-condensation product, about 23.3% by weight of acrylonitrile, this representing 10% by weight of the acrylonitrile in the original crude oil. The distillate, containing 90% of the acrylonitrile of the original crude oil, yielded on fractionation an acrylonitrile fraction, free from acrolein and hydrogen cyanide, which was found suitable for polymerisation purposes.

Of the acrylonitrile left with the condensation product in the residue from the climbing film evaporator, 98% was recoverable by steam distillation, but in view of the fact that it contained small amounts of acrolein and hydrogen cyanide it was only suitable for recycling to the vessel in which the condensation reaction took place.

*Example 4*

Crude acrylonitrile oil, obtained as described in Example 1 and containing 82.5% by weight of acrylonitrile, 9.6% by weight of hydrogen cyanide, 0.4% by weight of acrolein and 0.2% by weight of acrolein cyanhydrin was allowed to stand at 20° C. until the acrolein concentration had fallen to 0.04%. In this case the hydrogen cyanide was in excess over the acrolein. The resulting solution (17,400 parts by weight) was adjusted to pH 5 and was continuously fractionated to remove the hydrogen cyanide, of which 1497 parts by weight together with 20 parts by weight of acrylonitrile were obtained in the distillate. The residue (15,558 parts by weight), which contained the bulk of the acrylonitrile together with the acrolein-cyanhydrin condensation product, was then fed into a climbing film evaporator, the jacket temperature of which was maintained at 55° C., and under a pressure of 160 mm. of mercury and in which the acrylonitrile was distilled over into the distillate (13,950 parts by weight) leaving the cyanhydrin condensation product in the residue (1469 parts by weight) which also contained about 7% by weight of acrylonitrile. The distillate from the climbing film evaporator was then extractively distilled with water, through a continuous fractionating column to give a pure fraction containing 95% of acrylonitrile and 0.1% of hydrogen cyanide. This fraction, which was found suitable for polymerisation purposes, represented 92% by weight of the acrylonitrile in the crude oil starting material.

Example 4 showed the process of the invention applied to a solution containing an excess of hydrogen cyanide over acrolein, so that after the formation of the cyanhydrin condensation product some hydrogen cyanide, but substantially no acrolein, remained in the solution. In that example the resulting solution was first freed from hydrogen cyanide and then the acrylonitrile was separated from the acrolein-cyanhydrin condensation product. In Example 5 is shown the same process (hydrogen cyanide in excess) but the resulting solution is this time first treated for the separation of the condensation product and then freed from hydrogen cyanide.

*Example 5*

Crude acrylonitrile oil, obtained as described in Example 1 and containing 82.5% by weight of acrylonitrile, 9.5% by weight of hydrogen cyanide, 0.4% by weight of acrolein and 0.2% by weight of acrolein cyanhydrin was allowed to stand at 20° C. until the acrolein concentration had decreased to 0.04%. The resulting solution (15.75 parts by weight) after being adjusted to pH 5 was passed through a climbing film evaporator, whilst maintaining a jacket temperature of 60° C. and a pressure of 160 mm. of mercury, in which the acrylonitrile and hydrogen cyanide were distilled over into the distillate (1471 parts by weight) leaving the cyanhydrin condensation product in the residue (66 parts). The distillate, which contained 78.4% by weight acrylonitrile, 8.8% by weight of hydrogen cyanide and no acrolein cyanhydrin was then fractionated to remove the hydrogen cyanide.

I claim:

1. The process for the production of substantially pure unsaturated nitriles from an impure mixture containing the desired unsaturated nitrile together with the corresponding unsaturated aldehyde and hydrogen cyanide as impurities, which comprises reacting the unsaturated aldehyde and the hydrogen cyanide together to form a condensation product so that substantially the whole of one reactant is converted, and separating by distillation the resulting condensation product from the mixture containing the unsaturated nitrile and any remaining unconverted reactant before fractionating the mixture to recover the unsaturated nitrile.

2. A process as in claim 1 wherein the formation of the condensation product is carried out in the presence of catalytic amounts of an alkali.

3. A process as in claim 1 wherein the formation of the condensation product is carried out at a temperature below about 20° C.

4. A process as in claim 1 wherein the formation of the condensation product is carried out at a temperature of less than 10° C.

5. A process as in claim 1 wherein the formation of the condensation product is carried out in the absence of a substantial amount of a separate aqueous phase.

6. A process as in claim 1 wherein an excess of the unsaturated aldehyde over the hydrogen cyanide is produced by the addition of the unsaturated aldehyde to the impure nitrile mixture.

7. A process as in claim 1 wherein an excess of the hydrogen cyanide over the unsaturated aldehyde is produced by the addition of hydrogen cyanide to the impure nitrile mixture.

8. A process as in claim 1 wherein the impure nitrile mixture is brought to a pH value between 3 and 7 after formation and before separation of the condensation product.

9. A process as in claim 1 wherein the condensation product is separated from the impure nitrile mixture by rapid flash distillation.

10. A process as in claim 1 wherein the condensation product is separated from the impure nitrile mixture by distillation at a temperature below 100° C. and preferably below 70° C., and at subatmospheric pressures.

11. A process as in claim 10 wherein the separation is carried out in the presence of a diluent having a boiling point higher than that of the unsaturated nitrile which is being recovered.

12. A process as in claim 1 wherein the condensation product is separted from the impure nitrile mixture by distillation at a temperature below 100° C. and preferably below 70° C. and at subatmospheric pressures, and wherein some of the unsaturated nitrile remains in the residue together with the condensation product.

13. A process as in claim 1 wherein the condensation product is separated from the impure nitrile mixture by distillation at a temperature below 100° C. and preferably below 70° C., and at subatmospheric pressures, and wherein the overhead fraction from the distillation is further fractionated to give the desired unsaturated nitrile in a substantially pure state.

14. A process as in claim 1 wherein the impure nitrile mixture is obtained by the reaction of an unsaturated aldehyde in the vapour phase with ammonia, molecular oxygen and a catalyst at elevated temperatures.

15. A process for the production of substantially pure acrylonitrile from a mixture containing acrylonitrile, acrolein and hydrogen cyanide, which comprises reacting the acrolein and the hydrogen cyanide together at a temperature below about 20° C. to form a condensation product so that substantially the whole of one reactant is converted, and separating by distillation the resulting condensation product from the mixture before fractionating the mixture to recover the acrylonitrile.

16. A process which comprises maintaining a mixture containing acrylonitrile, acrolein, hydrogen cyanide and not more than 5% of water at a temperature below about 20° C., until condensation of acrolein and hydrogen cyanide occurs, one of said substances acrolein and hydrogen cyanide being present in excess of the amounts required for reaction therebetween, to produce a mixture of acrylonitrile, acrolein cyanhydrin and one of the substances acrolein and hydrogen cyanide and separating by distillation the acrolein cyanhydrin from the acrylonitrile and said substance by distillation at a temperature below 100° C.

17. A process as in claim 12 wherein the distillation residue containing the condensation product together with some unsaturated nitrile is partially fractionated to give an impure nitrile fraction, which is recycled to the vessel in which the impure nitrile mixture is treated for the formation of the condensation product.

References Cited in the file of this patent

UNITED STATES PATENTS

| | | |
|---|---|---|
| 2,336,493 | Marks | Dec. 14, 1943 |
| 2,351,157 | Semon | June 13, 1944 |
| 2,386,365 | Staudinger et al. | Oct. 9, 1945 |
| 2,404,163 | Carpenter et al. | July 16, 1946 |
| 2,417,635 | Davis | Mar. 18, 1947 |
| 2,433,060 | Ohsol et al. | Dec. 23, 1947 |
| 2,452,554 | Davis et al. | Nov. 2, 1948 |
| 2,527,660 | Spillane | Oct. 31, 1950 |
| 2,649,472 | Lovett | Aug. 18, 1953 |
| 2,653,966 | Taylor et al. | Sept. 29, 1953 |
| 2,691,037 | Bellringer et al. | Oct. 5, 1954 |

FOREIGN PATENTS

| | | |
|---|---|---|
| 484,453 | Canada | July 1, 1952 |

OTHER REFERENCES

Migrdichian, The Chemistry of Organic Cyanogen Compounds (1947), page 176.